US005640780A

United States Patent [19]

Kermabon

[11] Patent Number: 5,640,780

[45] Date of Patent: Jun. 24, 1997

[54] MOVING DEVICE FOR INTERVENING INSIDE SMALL-DIAMETER PIPEWORK

[75] Inventor: Christophe Kermabon, Neuilly S/Seine, France

[73] Assignee: S'Tell Diagnostic, Limonest, France

[21] Appl. No.: 458,037

[22] Filed: Jun. 1, 1995

[30] Foreign Application Priority Data

Jun. 8, 1994 [FR] France .................. 94 07273

[51] Int. Cl.[6] .................. G01C 9/00

[52] U.S. Cl. .................. 33/544; 33/302; 33/304

[58] Field of Search .................. 33/544, 1 BB, 33/542, 543, 543.1, 544.2, 544.3, 302, 304, 406, 312

[56] References Cited

U.S. PATENT DOCUMENTS

| | | | |
|---|---|---|---|
| 3,460,038 | 8/1969 | Beaver et al. | 33/312 |
| 3,732,625 | 5/1973 | Vernooy . | |
| 4,747,317 | 5/1988 | Lara | 33/304 |
| 4,835,876 | 6/1989 | Petermann et al. | 33/304 |

FOREIGN PATENT DOCUMENTS

| | | |
|---|---|---|
| 2085048 | 12/1992 | Canada . |
| 2689210 | 3/1992 | France . |
| 828173 | 1/1952 | Germany . |
| 2088554 | 11/1980 | United Kingdom . |
| 8001841 | 4/1980 | WIPO . |

OTHER PUBLICATIONS

Promotional Literature—Pipeline Cleaners Co. (Ft. Madison, Iowa, USA) (Date Unknown).

*Primary Examiner*—Christopher W. Fulton
*Attorney, Agent, or Firm*—Ladas & Parry

[57] ABSTRACT

The present invention relates to a moving device for intervening inside small-diameter pipework. The technical field of the invention lies in constructing measurement apparatus for monitoring pipework and capable of moving along the inside of the pipework in substantially independent manner driven by thrust from the substance conveyed by the pipework acting on the device. According to the present invention, the device comprises a drive piston itself made up of at least two flexible and strong annular tractor cups and defining a sealed section of inside surface, and at least one third centering cup disposed between said two tractor cups. The supports for said cups are interconnected axially in pairs by respective traction cables associated with respective springs surrounding said cables, each spring bearing at each end against said supports of two consecutive cups, and serving to keep said cable under tension.

10 Claims, 5 Drawing Sheets

41 41 41 11 9 17 15 16 8 5 6 2 7 9 10 4 10 3 13 12 1

26
24
$23_5$
22
$23_2$
$23_4$
$23_3$
$23_1$
21
4
3
1
2

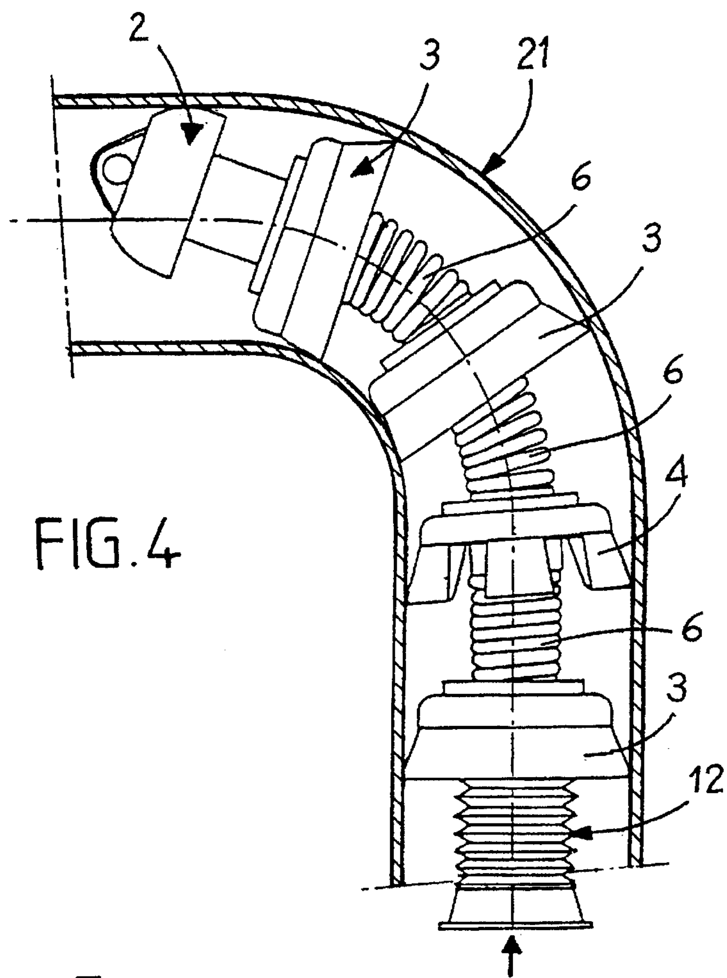
FIG. 4
FIG. 5
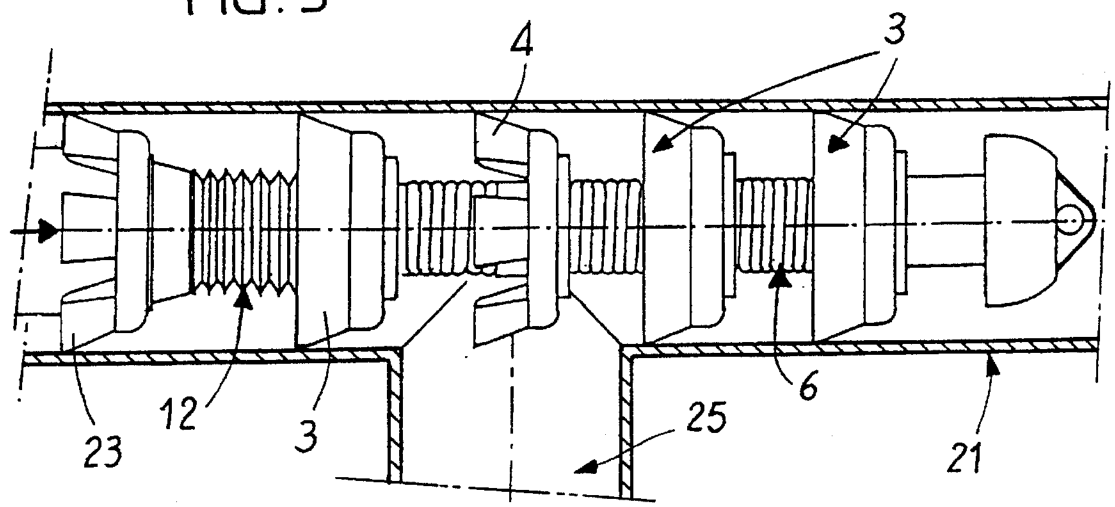

MOVING DEVICE FOR INTERVENING INSIDE SMALL-DIAMETER PIPEWORK

FIELD OF THE INVENTION

The present invention relates to a moving device for intervening inside small-diameter pipework and which, for convenience of language, may be referred to as a "rabbit", one of its nicknames in the art.

The technical field of the invention is that of making pipework measurement apparatus capable of moving inside the pipework in a substantially self-contained manner due to thrust from a substance being conveyed by the pipework on such a "rabbit" device.

One of the objects and applications of the invention is to be able to perform corrosion measurements from inside small-diameter pipework, e.g. having a diameter lying in the range 2 inches to 6 inches, i.e. 50 mm to 150 mm, over quite long distances, and regardless of the configuration of the pipework.

BACKGROUND OF THE INVENTION

Articulated rabbit systems are known for moving the measurement apparatus, which apparatus may either be incorporated in the rabbit itself, or else it may be towed behind the rabbit like a trailer. By way of example, mention may be made of French patent application 2,689,210 published on Oct. 1, 1993, which describes one such articulated drive rabbit, and which recalls the state of the art in this field and the problems posed by such systems: that document teaches "an articulated rabbit for modifying, maintaining, and inspecting pipework, in particular pipework for transporting oil products, the rabbit being of the type comprising at least two identical tubular bodies or 'trailers' disposed in alignment with each other and each provided on its outside wall with flexible and strong annular cups having an outside diameter that is substantially equal to the inside diameter of the pipework, and such that at least two trailers are in simple contact via their adjacent ends and are mechanically connected together by means of a flexible resilient coupling element such as a cable or a spring that passes axially through the chambers inside the two trailers and that exerts opposing traction forces on the trailers tending to press their adjacent ends against each other".

Such a system is indeed capable of passing through junction zones in the pipework while maintaining contact between at least one cup and the wall of the pipework so as to ensure continuity of propulsion, and it is also capable of negotiating bends without requiring a ball-and-socket or a universal joint and connection rod system for articulation purposes as exists elsewhere, which systems are either too fragile or else so heavy as to increase the wear of the supporting cups. Nevertheless, the need to have two tubular bodies each having at least two annular cups situated a certain distance apart does not enable such a rabbit to negotiate 90° sharp bends having a small radius of curvature, e.g. 1.5 times the diameter of the pipework, without running the risk of jamming, yet such bends often exist in pipe networks, particularly when the pipes are of small diameter. Indeed, small-diameter pipework prevents the use of ball-and-socket or universal joint type articulation systems which are then incapable, as indeed is the linking system of the above-mentioned patent application, of accommodating offsets between the axes of the articulated elements relative to the axis of the pipework without crushing and deforming the cups, thereby giving rise to the risks of the device becoming mechanically jammed in a bend, or else of the cups no longer providing sealing, which will in any case cause the device to stop moving.

OBJECTS AND SUMMARY OF THE INVENTION

The main problem posed is that of being able to provide a drive piston that is usable either on its own or else to tow trailers carrying various kinds of measuring equipment, and to be capable of moving on its own or with its trailers inside pipework that has bends through up to 90° and with a radius of curvature that may be as little as 1.5 times the bore diameter, and that also includes junction zones with other portions of pipework where it is necessary to be able to move past the resulting gap in the wall of the pipework, the bore diameter being at least 50 mm.

Another object of the present invention is to be able to provide a self-contained measurement device suitable for towing by said drive piston over distances of at least 12 km, and serving in particular to perform continuous corrosion measurement on the wall of the pipework throughout said distance.

A solution to the problem posed is a moving device for intervening inside small-diameter pipework, the device comprising a drive piston made up of at least two annular tractor cups each having a flexible and strong peripheral skirt of the same outside diameter, and each defining a sealed section of inside surface, and at least a third non-sealing centering cup disposed between said two tractor cups, and in which the supports for said cups are interconnected axially in pairs by means of a traction cable and a fixed spring that bears at each of its ends against said supports for two consecutive cups, surrounding said cable and putting it under tension when the device is in a position in which it is laterally flexed, i.e. when negotiating bends, the spring serving as the sole towing element in linear sections of the pipework.

For pipework having an inside diameter of 50 mm to 100 mm, the distance between the outside edges of the skirts of two consecutive cups preferably lies in the range 45 mm to 50 mm, with the spring having a length of 30 mm to 35 mm for a spring diameter of 25 mm to 30 mm and the number of turns being 7 or 8. In addition to maintaining tension in the coupling cable which provides traction, particularly while negotiating bends, the spring also serves to impart mechanical stiffness to the coupling between cups and to ensure that they are mutually centered, particularly on straight lines, since if one cup should be deflected relative to another, the spring coupling them together applies a return torque which brings them back into alignment.

Preferably, all of the cups, whether centering cups or towing cups, are interchangeable on the same supports, both for the above-defined drive piston and for the trailer modules described below. This makes it possible firstly to replace a cup in the event of wear, and secondly to use the same mechanical elements for traction, coupling, and trailer module purposes in pipework of different diameters. For example, with the dimensions given above, the same cup supports that can therefore be used with cups having a minimum outside diameter of as little as 50 mm can nevertheless also be used in pipework of any diameter up to 100 mm. However, for cup and pipework diameters exceeding 75 mm, it is necessary to add a third annular tractor cup having the same diameter as the other two and situated at the leading end of the rabbit in order to lengthen the rabbit and thereby enable it to pass through a junction in the pipework. It is thus ensured that at least one of said tractor cups is in sealed engagement on one side or the other of said junction, thereby ensuring that the driving fluid exerts thrust and moves the entire assembly: an example of this situation is given in FIG. 5.

In order to help in negotiating curved portions, it is also preferable for the rabbit to carry a front guide whose outside surface is rounded and a surface of revolution, which guide is rigidly connected to the leading tractor cup, and has a maximum outside diameter that is smaller than the minimum outside diameter of the cup. By penetrating first into a curve, such a front nose-forming guide bears against the inside wall of the curve having the largest diameter of curvature, thereby forcing the nose round the curve, as shown in FIG. 4, and imparting pre-curvature to the drive piston and thus beginning flexing thereof, as is made possible by the first spring interconnecting the first cups, after which the drive piston continues to flex at the other springs as they too follow the curve of the bend.

The result is a novel moving device for intervening inside small-diameter pipework, the device comprising at least one drive piston that is indeed capable of negotiating bends and functions in the pipework of the kind described when posing the problem, without thereby losing its potential traction capacity, and without suffering from the drawbacks of presently known systems.

In addition, when it is desired to make measurements inside such pipework, the drive piston may be used as a tractor of the device which then further includes at least one trailer module made up of at least two non-sealing centering cups situated one behind the other, having the same outside diameter, and secured to a rigid body that interconnects them, supports them, and contains at least one piece of equipment for intervening in the pipework. The front of said first trailer module is connected to the said rabbit, and its rear end may optionally be connected to a following trailer module. The connections between the modules are provided by coupling chains each having at least two links which are fixed freely to respective hooking supports secured to the facing ends of said trailers, with one of the hooking supports being at the rear of the drive piston. Preferably and in optimum manner, two links suffice, since an additional link would run the risk of rubbing in small-radius bends. The use of such coupling assemblies based on chains limits rotation of the trailers relative to one another since they have an anti-twisting effect, while they nevertheless leave the trailers a certain amount of freedom to move relative to one another, particularly with respect to their axes moving away from the axis of the pipework, especially in bends, unlike universal joints or connecting rod systems that jam in bends of the kind defined above. In addition, like the cables and springs providing coupling between the cups of the drive piston, said chains are capable of transmitting traction forces of the order of at least 300 kg.

To measure corrosion continuously along an entire length of pipework, e.g. over at least 12 km, the device of the invention includes at least five trailer modules coupled one behind the other to said above-defined drive piston, the modules comprising a power supply module including an electrical battery, at least one module that includes a coil for emitting a magnetic field, another module that includes a coil for receiving said magnetic field, another module which includes an odometer wheel for measuring distance, and another module constituting a central unit associated with storage capacity, the entire device having a maximum length of 1.50 meters. All of said trailer modules are interconnected by power supply and data transfer cables, and the last trailer situated at the rear end of the device has a connector enabling any compatible external equipment to be connected thereto in order to transfer the contents of the memory in which the measurement data has been stored during a trip. Such a connection can thus be made immediately after the intervention has taken place and the results can therefore be used immediately.

The disposition of the above device makes use of the known technique of measuring corrosion by far-field electromagnetic methods using eddy currents. An emitter coil implemented as a solenoid mounted axially in the apparatus carries an electric current which, when applied to said coil, serves to generate a magnetic field which is coupled to the receiver coil via the pipework. The difference in phase between the emitted signal and the signal induced on reception is proportional to the quantity of metal overlying the receiver and emitter coils. Various factors have an effect on this phase difference between the emitting current and the induced voltage, and the thickness of the pipework is obtained from a relationship of the type $E=\delta\times\Phi/114.6$ where $\Phi$ is the phase difference, $\delta$ is known as the "skin thickness" such that $\delta=1\sqrt{\pi\mu\Phi\alpha}$ where $\mu$ is permeability, f is excitation frequency and $\alpha$ is metal conductivity.

This measurement technique is preferred in the context of the present invention for the purpose of performing corrosion measurements, while nevertheless complying with the geometrical constraints of small-diameter pipework and power constraints as set by the operating limits that can be achieved on one battery charge while performing measurements over long distances. This particular measurement system does not consume a great deal of power.

Other techniques and methods do indeed exist for measuring the thickness of pipework, e.g. by means of magnetic flux, whereby measurements are made of field line deformation as caused by a defect such as a loss of metal, but that requires multiple sensors. That works well in large-diameter pipework but is difficult to miniaturize because, in addition to the large number of sensors, a large amount of power is also consumed. Methods based on sound also exist in which echoes reflected on the inside and outside walls of the tube are measured, however they also require multiple sensors and a considerable amount of power, and in any event they are difficult to apply to pipework used for conveying gas.

It is clear that the system of performing far-field electromagnetic measurements using eddy currents, as in the present invention, is unsuitable for determining the exact angular radial position of a defect in a given section of pipework. However, although determining radial position can be advantageous with large-diameter pipework, so as to identify accurately the location concerned, with small-diameter pipework any repairs that may be required will in any event consist in replacing a length of pipework without paying any attention to the angular position of the defect.

The combination of such a corrosion measurement system and a mechanical assembly that is flexible, and articulated, including a drive piston, trailer modules, and various coupling systems as described above and below, constitutes a novel device that is specific and functional, that satisfies the problems and objects posed, and that avoids the drawbacks of present systems.

Other advantages of the present invention could also be mentioned, however those mentioned above already suffice to demonstrate the novelty and the advantages of the invention. The following description and the figures relate to embodiments of the invention but are not limiting in any way.

Other embodiments are possible within the ambit of the scope and the extent of the present invention, in particular either by using the drive piston device on its own, or else by using it in combination with other trailer modules including measurement systems other than for measuring corrosion.

Furthermore, with respect to the dimensions of pipework in which the invention is applicable, devices of the kind described below are preferably used in association with bore diameters lying specifically in the range 50 mm to 150 mm, while making it possible to pass through bends as defined above. However, in larger-diameter pipework, it may be preferable to dispose the same various modules, i.e. the trailer modules suitable for use in small-diameter pipework, in parallel in a squirrel-cage type configuration, thereby reducing the total length of the device. It is also clear that even though the mechanical coupling elements between the cups of the drive rabbit and between trailer modules based on the principles described above and below are indeed capable of being used in pipework of different diameters, as mentioned above, they could nevertheless be provided in different sizes as a function of the dimensions of the pipework in which the moving device of the invention is to be used.

BRIEF DESCRIPTION OF THE DRAWINGS

FIG. 4 is a view showing the position of the drive piston as it engages a 90° bend having a radius of curvature that is 1.5 times the diameter of the pipework.

FIG. 5 is a section view through a drive piston passing through a junction in the pipework.

MORE DETAILED DESCRIPTION

Figure 1:
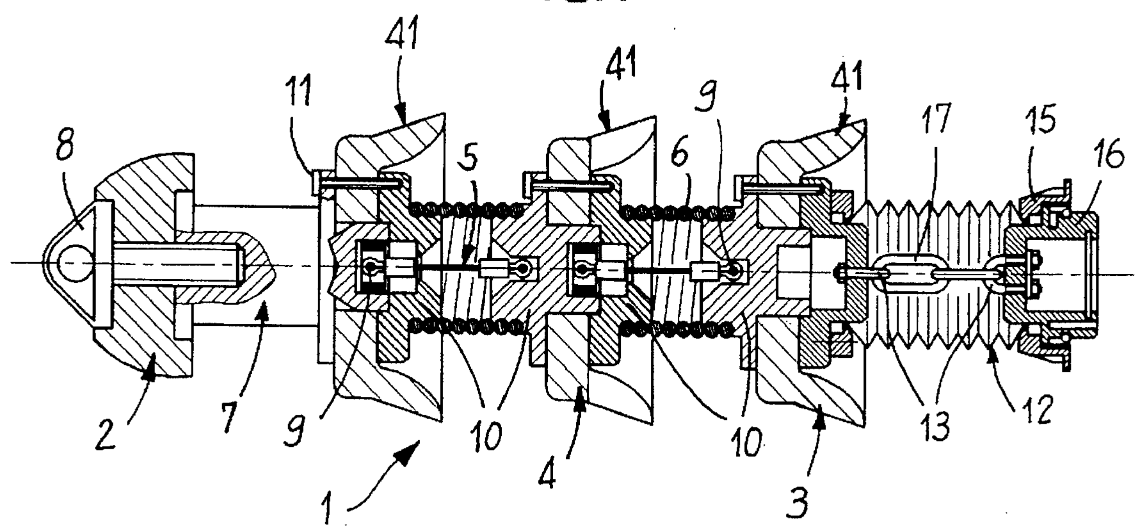
FIG. 1 is a longitudinal section through a drive piston or tractor of the invention.

The drive piston 1 as shown in FIG. 1 comprises at least two strong and flexible tractor cups 3 that are annular and define a bell-shaped sealed inside surface with its open end facing towards the rear of the rabbit so that the pressure of fluid travelling along the pipework in which the rabbit is placed causes said cups to flare, thereby pressing their outer skirts 41 against the inside walls of the pipework, in spite of possible defects in the walls. The resulting mutual sealing causes the pressure of the fluid to be converted into a thrust force enabling the drive piston 1 to move along the inside of the pipework and to tow various trailer modules 23 such as those described with reference to the following figures. Such "rabbit" devices made up of cups are known. However, in the present invention, said drive piston 1 also includes at least one third cup 4 for centering purposes, having a skirt 41 that is non-sealing, but that must be flexible in order to perform its function of guiding the coupling elements between the tractor cups 3 while ensuring sufficient distance between any two of them to make it possible to pass through a junction, as shown in FIG. 5. Such a junction 25 may be a T-junction or a Y-junction and it presents a break in the wall of the pipework 21 along which the rabbit is travelling, such that when passing through such a junction, a tractor cup 3 can find itself in the middle of the gap due to the junction 25, in which case it is essential for the other tractor cup 3 to be at a sufficient distance from the first cup (either upstream or downstream) in a portion of the pipework that is not interrupted by the junction so as to ensure that the necessary sealing and drive continue to function.

The supports 10 of said cups 3 or 4 can be constituted by any system, e,g. a system in which said cups are sandwiched between flanges that are clamped together by a screw type fixing system 11. Said supports 10 are interconnected in pairs in an axial direction by means of a cable 5 and a fixed spring 6 bearing at each of its ends on said cup supports 10. During straight line travel, the spring 6 serves on its own to provide traction between the cups, with the cable 5 being slack. The spring 6 surrounds the cable 5 in symmetrical manner, such that in bends, that has the effect of tensioning the cable so that it is the cable that makes it possible to pass through bends by a couple effect against the inside portion of the spring whose turns remain pressed together.

For a given distance between the ends of the skirts 41 of the tractor cups 3, as defined above for pipework having inside diameters lying in the range 50 mm to 75 mm, for example, if it is desired to use the same drive piston up to a diameter of 100 mm, merely by changing the diameter of the cups, it is necessary to provide a third annular tractor cup 3 situated at the leading end of the drive piston, as shown in FIGS. 4 and 5. This third tractor cup makes it possible to pass through a function 25 which then naturally provides an opening of larger size in the through pipework 21 and thus to a gap of greater length that needs to be bridged in the wall thereof.

As shown in FIG. 4, in order to assist the rabbit in flexing round a sharp bend, e.g. a 90° bend having a radius of curvature that is 1.5 times the diameter of the pipework, said drive piston has a front guide 2 whose outside surface is a rounded surface of revolution, and which is rigidly connected to the leading tractor cup, e.g. by means of a block 7 linking it to the support of said cup. The guide 2 thus constrains the first tractor cup 3 to swivel relative to the following cup which, being pulled by the coupling cable 5, is nevertheless held in a centered and guided position by the spring 6 whose turns bear against one another towards the inside of the bend, whereas they spread apart towards the outside, thereby generating a return force between the cups while the device is passing through the bend.

The leading guide may include a coupling and assembly screw 8 at its leading end, and said cables 5 may be fixed to the cup carrying supports 10 by any type of fastening 9, e.g. fastening pins.

Figure 2:
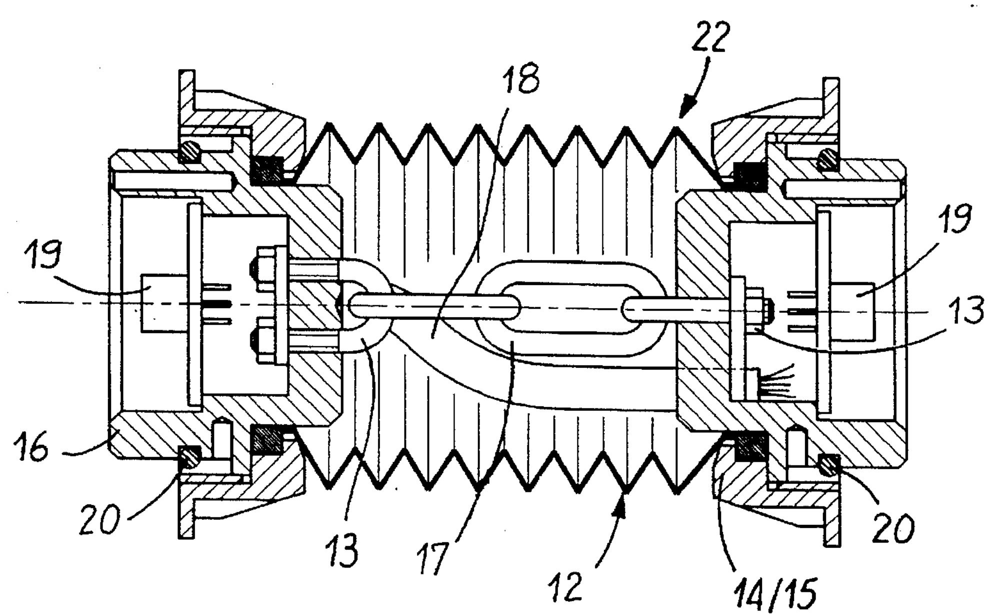
FIG. 2 is a longitudinal section through a coupling assembly between a drive piston or tractor and a trailer, or between two trailers.

When the drive piston i is used for towing various trailer modules as shown in the following figures, the rear end thereof has a chain coupling assembly 22 as shown in greater detail in FIG. 2, which coupling is made up essentially of a length of chain comprising at least two links 17. The links are fixed by any appropriate shackle type device 13 to coupling elements such as plugs 16 that are inserted in the rigid bodies 24 of the trailer modules, as shown in the following figures. Said coupling elements 16 are fixed to said trailer modules by flange type systems 15 that can also be used for securing one end of a protective bellows 12 for protecting the chain and a coupling cable 18 between two successive trailers. Said coupling cable 18 is then connected at each end to connectors 19 situated in said plugs 16 and serving to interconnect the systems on board each trailer module situated at either end of said coupling assembly 22.

In order to seal the inside volumes of the bodies 24 of said modules in which said coupling plugs 16 are inserted, O-rings 20 may be disposed around the peripheries of said plugs 16 so as to come into contact with the inside diameters of said rigid bodies 24, thereby providing sealing.

Figure 3:
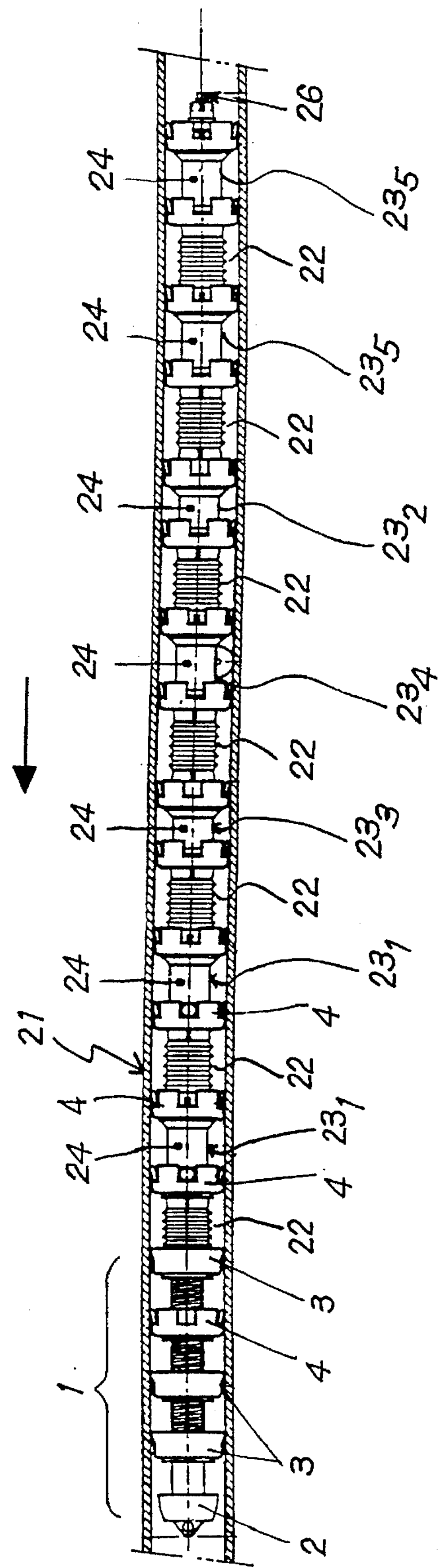
FIG. 3 is an overall section view through a length of pipework having the complete moving device of the invention moving therealong, the device comprising a drive piston and a plurality of instrumentation trailer modules.

As shown in FIGS. 6 to 9, and in overall FIG. 3, said trailers 23 comprise at least two centering cups 4 whose skirts 41 are non-sealing so as to allow fluid to pass all the way to the tractor skirts of the drive element 1. Each of said centering cups 4 is secured to a rigid body 24 which supports it and which also contains various kinds of instrumentation equipment, as described below.

Figure 8:
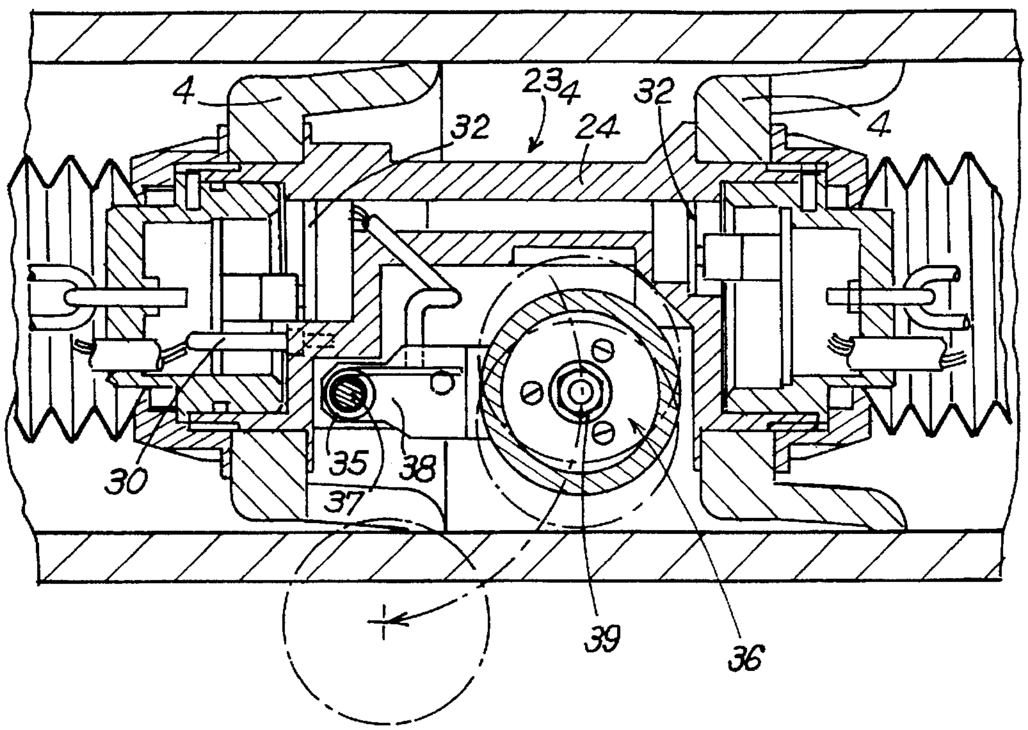
FIG. 8 is a longitudinal section view through a trailer module carrying an odometer wheel.
Figure 9:
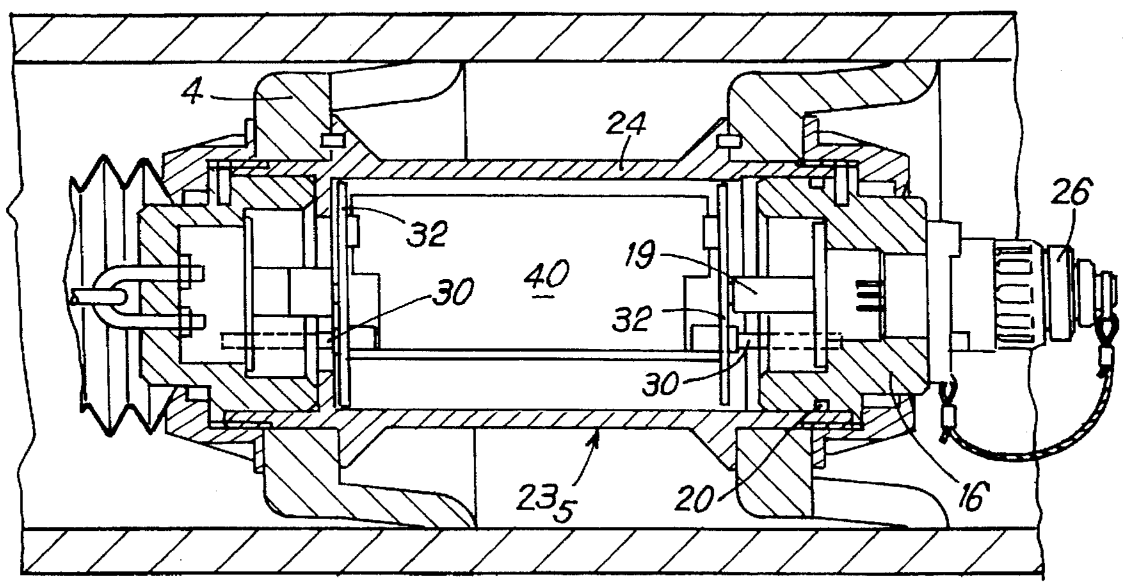
FIG. 9 is a longitudinal section view through a trailer module containing a central unit and storage capacity, and suitable for being placed at the trailing end of the moving device.

In particular, FIG. 9 shows one of the trailers $\mathbf{23}_5$ that includes a central unit 40 which is associated with storage capacity serving to store all of the measurement information that may be generated by any of the measurement systems on board said device. Such systems are described for the various trailer modules shown in FIGS. 7 to 9. The trailer module $\mathbf{23}_5$ is made up of the same mechanical and assembly elements as all of the others, and in particular, in addition to the elements already described, it may include internal support plates 32 for supporting said central unit 40 and various other elements such as a backup battery and a memory, together with various centering rods 30 enabling the elements to be fitted together during assembly.

The trailer $\mathbf{23}_5$ contains at least one memory for storing all of the information measured during an intervention of said moving "rabbit" device, and it is situated at the rear end of the device together with a connector 26 enabling any compatible external equipment to be connected thereto for the purpose of transferring the contents of said memory. The connector 26 includes a sealing cap that is closed while intervention is taking place in the pipework, and it is mounted on the plug 16 that closes the rigid body 24 of said trailer module $\mathbf{23}_5$, like the connectors included in the above-described coupling elements.

Figure 6:
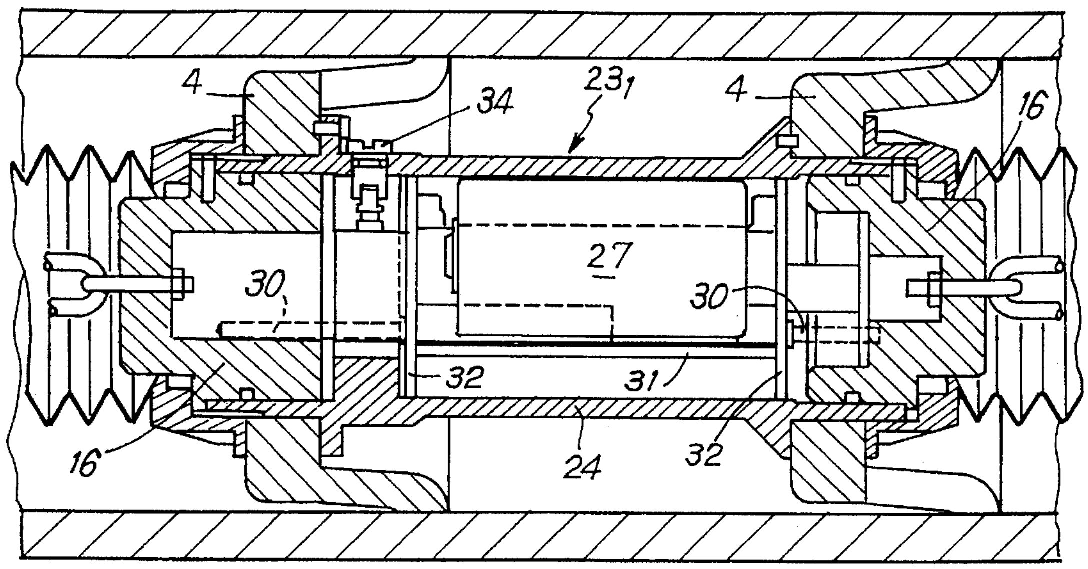
FIG. 6 is a section view through a power supply module trailer in pipework.

FIG. 6 shows a trailer module $\mathbf{23}_1$ of the power supply type including an electrical battery 27 together with an on/off switch 34 that is accessible from the outside via a screw type system to enable the measurement system to be powered up and started when the device is inserted into the pipework that is to be inspected. Like the other modules, such a module $\mathbf{23}_1$ may also include a coupling support 31 coupling together inside support plates 32, together with various electronic components: the battery 27, which is preferably a lithium battery like such backup batteries as may also be included in the various other modules, thereby enabling a maximum amount of electrical energy to be stored in a minimum volume. Other power supply trailer module elements may be centered in series or in parallel, e.g. each serving to power a corresponding one of the measurement systems or the central unit 40 of the module $\mathbf{23}_5$.

Figure 7:
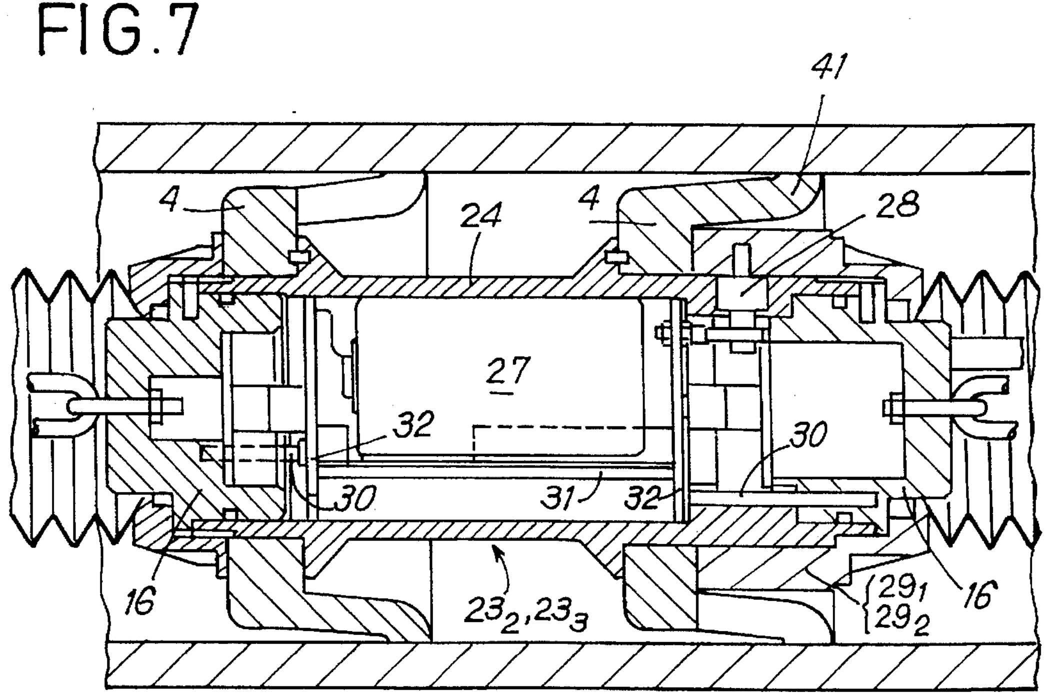
FIG. 7 is a longitudinal section view through a trailer module for emitting or receiving an electromagnetic field to measure corrosion.

In order to make it possible to use the technique of performing far-field electromagnetic measurements and eddy currents, as described above, at least one of the trailers $\mathbf{23}_2$ carries an emitter coil $\mathbf{29}_1$ as shown in FIG. 7 for the purpose of establishing a magnetic field around the trailer $\mathbf{23}_2$, which coil is disposed circularly around a portion of the rigid body 24 of the trailer and is externally protected by the skirt 41 of one of the centering cups 4 of said trailer $\mathbf{23}_2$. In the volume available in its central rigid body 24, the trailer may also include an additional or topping-up power supply battery 27, and a contact 28 that passes through said rigid body 24 serving to establish a sealed electrical connection between the inside of the body and said coil $\mathbf{29}_1$ situated on the outside of the body.

In order to have sufficient distance between the emitter coil $\mathbf{29}_1$ and the receiver coil $\mathbf{29}_2$, the receiver coil is disposed in another trailer $\mathbf{23}_3$ identical to the trailer described above with respect to the emitter coil $\mathbf{29}_1$, so the same FIG. 7 and the same description as given above applies in like manner.

Although a measurement device of the kind described above is not capable of giving the radial position of a fault in a section of pipework, the longitudinal position of the fault relative to the starting point from which measurements begin in the pipework is essential in order to determine the location where a possible repair ought to be performed. For this purpose and as shown in FIG. 8, at least one of the trailers $\mathbf{23}_4$ of the device of the invention is provided with an odometer wheel 36 disposed between the two centering cups 4 of said trailer $\mathbf{23}_4$ carrying said wheel 36. The wheel 36 is mounted on an arm 38 that pivots about an axis 37 and that is associated with a return spring 35 urging the wheel out from the volume in which said trailer $\mathbf{23}_4$ is contained. The arm 38 is capable of being retracted into the trailer so that said wheel 36 can be received in a cylindrical volume that is no greater than the volume occupied by the cylindrical body 24 of said trailer $\mathbf{23}_4$.

The wheel mounted in this way between the two centering and load-carrying cups of the module is kept permanently in contact with the wall of the pipework 21 by means of a system comprising a spring and its pivot arm 38, thereby ensuring that distance measurement is performed accurately, and in any event better than in many other presently-existing systems. Such systems do indeed comprise an odometer wheel, but it is cantilevered out from the rear end thereof so it often loses contact with the wall of the pipework in regions of curvature. In the device shown in FIG. 8, since the wheel is capable both of being received inside the volume defined by said cups and, on the contrary, of extending from said volume under relatively extreme circumstances as shown in chain-dotted lines in the figure, it is capable of tracking the inside of a curve without running any risk of jamming the device, and also of tracking the outside of a curve in a bend without losing contact. The distance measuring system proper may be constituted by any known equipment such as a proximity sensor secured to the arm 38 of the wheel and an exciter secured to the wheel, thus giving one pulse each time it moves past the proximity sensor.

FIG. 3 shows an example of a complete moving device of the invention that comprises: a leading drive piston 1; and seven trailer modules connected one behind the other to said drive piston, and made up as follows: two power supply modules $\mathbf{23}_1$; one module $\mathbf{23}_3$ for carrying the magnetic field emitting coil $\mathbf{29}_1$ and as described in FIG. 7; one module $\mathbf{23}_2$ situated two modules behind the emitting module for the purpose of carrying the magnetic field receiver $\mathbf{29}_2$ and of receiving a far field that is more clearly marked as such; between the modules $\mathbf{23}_2$ and $\mathbf{23}_3$ there is the module $\mathbf{23}_4$ carrying the odometer wheel; whereas the last two modules $\mathbf{23}_5$ carry firstly a controlling and monitoring central unit for the entire device, and secondly additional memory. Clearly the order of said modules could be changed and the number of modules could be increased or reduced, even while ensuring that the overall length of the moving device does not exceed a length of 1.50 m in order to remain compatible with the docking means conventionally provided for launching such devices into pipework that is to be inspected, all of which is made quite possible by the present invention when using elements as described above.

I claim:

1. A moving device for intervening inside small-diameter pipework, the device comprising a drive piston made up of at least two annular tractor cups each having a flexible and strong peripheral skirt of the same outside diameter, and each defining a sealed section of inside surface, wherein said drive piston includes at least a third non-sealing centering cup disposed between said two tractor cups, and supports for said cups, said supports being interconnected axially in pairs by means of a cable and a fixed spring surrounding said cable and having ends that bear against said supports for two consecutive cups, said fixed spring providing traction between two consecutive cups with said cable being slack when said device is in a straight position and said fixed spring enabling said cable to be tensioned when said device is in a laterally flexed position.

2. A device according to claim 1, wherein said drive piston includes a third tractor annular cup having the same diameter as the other two and situated at the leading end of said device.

3. A device according to claim 1, wherein said drive piston includes a leading guide whose outside surface is a surface of revolution and is rounded in shape, having a maximum outside diameter that is smaller than the minimum outside diameter of said cups, and which is rigidly connected to the leading tractor cup.

4. A device according to claim 1, wherein all of said cups are interchangeable on the same supports and their minimum outside diameter is 50 mm.

5. A device according to claim 1, including at least one trailer module made up of at least two non-sealing centering cups situated one behind the other, having the same outside diameter, and both secured to a rigid body that interconnects them, that supports them, and containing at least one piece of equipment for intervening in said pipework, which first trailer module is connected at its leading end to said drive piston and optionally at its trailing end to the following trailer module, and so on between trailer modules by means of a single chain at each coupling, the chain comprising at least two links freely fixed to hooking supports secured to the ends of said trailers, and one of said hooking supports being secured to the rear of the drive piston.

6. A device according to claim 5, wherein at least one of the trailers includes a central unit associated with storage capacity for storing all of the measurement information picked up by any measurement system on board said device, and the last trailer at the rear of the device includes a connector enabling it to be connected to any compatible external equipment in order to transfer the contents of said memory therein.

7. A device according to claim 5, wherein at least one of the trailers includes an odometer disposed between the two centering cups of said trailer supporting said wheel, which wheel is mounted on an arm pivoting about an axis and is associated with a return spring urging it out from the volume in which said trailer is inscribed, which arm is also capable of being retracted into the trailer so as to enable said wheel to be retracted into a cylindrical volume that is no greater than that which is occupied by the rigid body of said trailer.

8. A device according to claim 5, wherein at least one of the trailers includes an emitter coil for creating a magnetic field around said trailer, the coil being disposed circularly around a portion of the rigid body of the trailer and being externally protected by the skirt of one of said centering cups of said trailer.

9. A device according to claim 8, wherein at least one of the trailers includes a receiver coil for measuring the magnetic field created by the emitter coil, and likewise circularly disposed around a portion of the rigid body of said trailer and protected by the skirt of one of said centering cups thereof.

10. A moving device according to claim 9, comprising at least five trailer modules connected one behind the other and to said drive piston, at least one of the modules including an electrical battery, another module including at least one magnetic field emitting coil, another module including said magnetic field receiving coil, another module including a distance-measuring odometer wheel, and another of said modules including a central unit associated with a storage capacity, the overall length of the device not exceeding 1.50 meters.

* * * * *